(12) United States Patent
Liu

(10) Patent No.: US 9,149,981 B2
(45) Date of Patent: Oct. 6, 2015

(54) SOLDERING DEVICE FOR PLASTICS ADHERING

(71) Applicant: Chao-Chih Liu, Taichung (TW)

(72) Inventor: Chao-Chih Liu, Taichung (TW)

(\*) Notice: Subject to any disclaimer, the term of this patent is extended or adjusted under 35 U.S.C. 154(b) by 496 days.

(21) Appl. No.: 13/629,627

(22) Filed: Sep. 28, 2012

(65) Prior Publication Data
US 2014/0091075 A1 Apr. 3, 2014

(51) Int. Cl.
| | | |
|---|---|---|
| *H05B 1/00* | (2006.01) | |
| *B29C 65/22* | (2006.01) | |
| *B29C 65/34* | (2006.01) | |
| *B29C 65/56* | (2006.01) | |
| *B29C 65/72* | (2006.01) | |
| *B29C 73/34* | (2006.01) | |
| *B29C 65/00* | (2006.01) | |
| *B29C 73/04* | (2006.01) | |

(52) U.S. Cl.
CPC ............. *B29C 65/222* (2013.01); *B29C 65/228* (2013.01); *B29C 65/342* (2013.01); *B29C 65/3468* (2013.01); *B29C 65/564* (2013.01); *B29C 65/72* (2013.01); *B29C 66/1162* (2013.01); *B29C 66/43* (2013.01); *B29C 66/43421* (2013.01); *B29C 66/8167* (2013.01); *B29C 66/8618* (2013.01); *B29C 73/04* (2013.01); *B29C 73/34* (2013.01); *B29C 65/3476* (2013.01); *B29C 66/221* (2013.01)

(58) Field of Classification Search
CPC ... H01L 23/345; H01L 24/81; H01L 2924/14; H05K 1/0212; H05K 3/3494; B29C 73/04; B29C 73/34; B29C 65/3476; B29C 65/228; B29C 65/342; B29C 65/3468; B29C 65/564; B29C 65/72; B29C 66/8618; B29C 66/1162; B29C 66/43; B29C 66/43421; B29C 66/8167; B29C 66/222; B29C 66/221

USPC ............. 219/209, 233, 230, 234, 85.1–85.22, 219/78.02, 129, 223; 264/445, 171.22, 264/319–322, 901–906

See application file for complete search history.

(56) References Cited

U.S. PATENT DOCUMENTS

| | | | | |
|---|---|---|---|---|
| 1,670,998 | A | * | 5/1928 | Vollmer et al. ................ 219/223 |
| 3,637,129 | A | * | 1/1972 | Kaufman ...................... 228/20.5 |
| 3,852,565 | A | * | 12/1974 | Kager ............................ 219/241 |
| 3,853,669 | A | * | 12/1974 | Werstlein ...................... 156/497 |
| 3,897,296 | A | * | 7/1975 | Waldrum ................... 156/304.2 |
| 4,064,447 | A | * | 12/1977 | Edgell et al. .................. 320/111 |
| 4,065,034 | A | * | 12/1977 | Callan ........................ 222/146.5 |
| 4,199,096 | A | * | 4/1980 | Keefe et al. ..................... 228/52 |
| 4,205,221 | A | * | 5/1980 | Meyer ........................... 219/230 |
| 4,245,759 | A | * | 1/1981 | Baker et al. ................. 222/146.5 |
| 4,285,758 | A | * | 8/1981 | Clausen et al. ............... 156/498 |
| 4,415,116 | A | * | 11/1983 | Norton ..................... 228/180.21 |
| 4,507,545 | A | * | 3/1985 | Riordan ........................ 219/230 |

(Continued)

*Primary Examiner* — David Angwin
*Assistant Examiner* — Gyounghyun Bae

(57) ABSTRACT

A soldering device for plastics adhering includes a handle having two protruded rings and a button assembly, a body having a pivoting portion and a head portion, the body pivotally rotated relative to the handle in a certain angle between the body and the handle, two conducting rods electrically connected to the button assembly, one end of each conducting rod inserted into the body, another end of each conducting rod exposed out from the body, an electrical storage element assembled into the handle and electrically connected to the button assembly and the two conducting rods. Therefore, when a user presses the button assembly, a unit of electricity is delivered to the conducting rod, so that an amount of heat is generated to adhere or repair an article.

7 Claims, 7 Drawing Sheets

(56) References Cited

U.S. PATENT DOCUMENTS

| | | | |
|---|---|---|---|
| 4,548,305 A * | 10/1985 | Anderson | 192/56.54 |
| 4,591,696 A * | 5/1986 | Eisen | 219/230 |
| 4,598,855 A * | 7/1986 | Bell et al. | 228/52 |
| 4,692,587 A * | 9/1987 | Spirk et al. | 219/242 |
| 4,773,566 A * | 9/1988 | Hoagland | 222/146.5 |
| 4,793,541 A * | 12/1988 | Dravnieks | 228/52 |
| 4,916,289 A * | 4/1990 | Suhanek | 219/230 |
| 4,967,059 A * | 10/1990 | Wagner | 219/230 |
| 5,236,269 A * | 8/1993 | Handy | 401/1 |
| 5,569,400 A * | 10/1996 | Lee | 219/233 |
| 5,664,701 A * | 9/1997 | Massena | 222/146.5 |
| 5,685,079 A * | 11/1997 | Brothers et al. | 30/161 |
| 5,944,028 A * | 8/1999 | Gebhard | 132/216 |
| 7,156,278 B2 * | 1/2007 | Wu | 228/44.3 |
| 8,274,011 B2 * | 9/2012 | Masaki | 219/85.16 |
| 2007/0095798 A1 * | 5/2007 | Kraz | 219/85.1 |
| 2012/0097660 A1 * | 4/2012 | Bao | 219/209 |

\* cited by examiner

SOLDERING DEVICE FOR PLASTICS ADHERING

BACKGROUND OF THE INVENTION

1. Field of the Invention

The present invention relates to a soldering device, and more particularly to a soldering device for plastics adhering.

2. Description of Related Art

In order to manufacture different kinds of electric products and plastic products, people bind several elements with each other to form these products. Therefore, methods for binding elements become an important issue. One of these methods is soldering, which is performed by melting parts of one element and attaching said element to another element via heat energy.

In addition of attaching elements, soldering is also applicable to repair the cracks or holes for plastic products. People used to apply adhesives to repair the cracks on a plastic product in the past; however, the original crack will break easily for a long-term use because of the poor adhesion ability of the adhesives.

A conventional soldering gun comprises a body, a driving mechanism having a clutch, a first connecting bar, a second connecting bar, a sliding blocker and a heating head, one end of the clutch pivotally rotated relative to the body, another end of the clutch connected to one end of the first connecting bar, another end of the first connecting bar pivotally connected to one end of the second connecting bar, another end of the second connecting bar pivotally connected to the sliding blocker which is assembled to the heating head, the driving mechanism further having a spring, a stopping blocker and a rail. Under this arrangement, when a user launches the clutch, the heating head is exposed out of the body because of the driving mechanism so as to offer a safety for the user.

However, the conventional soldering gun has a disadvantage as following.

When the user solders the cracks which are at a corner of a target, the user may twist their wrist for soldering said target in a long period. Therefore, the user will feel uncomfortable because the said twisting leads a pain to the muscle of the user.

The present invention has arisen to mitigate and/or obviate the disadvantages of the conventional.

SUMMARY OF THE INVENTION

The main objective of the present invention is to provide a soldering device.

To achieve the objective, a soldering device for plastics adhering comprises a body, a handle, two conducting rods and an electrical storage element, the handle having two protruded rings opened at one end therethrough, the handle having a button assembly defined at an outer periphery thereof, the body having a pivoting portion defined at one end thereof, the pivoting portion pivotally assembled to the two protruded rings, the body having a head portion defined at another end thereof, the body pivotally rotated relative to the handle in a certain angle between the body and the handle, one end of each conducting rod inserted into the head portion of the body, another end of each conducting rod exposed out from the body, the conducting rods electrically connected to the button assembly, the electronic storage element assembled into the handle, the electronic storage element electrically connected to the button assembly and the two conducting rods. Wherein, the pivoting portion of the body has two limiting rooms opened at two sides thereof; the handle has two positioning rooms opened thereon; each positioning room is opposite to each corresponding protruded ring; the two positioning rooms correspond to the two limiting rooms respectively; the soldering device for plastics adhering further has a pivoting assembly comprising two positioning slices, two limiting slices and a pivoting rod; the two positioning slices are assembled into the two positioning rooms respectively; each positioning slice has a plurality of positioning apertures opened thereon; the two limiting slices are assembled into the two limiting rooms respectively; each limiting slice has a plurality of limiting blocks extruded thereon; the limiting blocks correspond to the positioning apertures; the pivoting rod is passed through protruded rings of the handle, the pivoting portion of the body, the positioning slices and the limiting slices so that the body is pivotally rotated relative to the handle so as to drive one limiting block to locate into any one of the positioning apertures; each limiting slice has a plurality of limiting ribs extruded from an outer periphery thereof; each limiting room has a plurality of limiting grooves recessed therein; the limiting ribs correspond to the limiting grooves respectively; each positioning slice has a positioning rib extruded from an outer periphery thereof; each positioning room has a positioning groove recessed therein; the positioning rib corresponds to the positioning groove respectively; the body has a lightening element defined thereon. The lightening element is electrically connected to the electrical storage element and the button assembly separately; the body has an electric quantity display defined thereon; the electric quantity display is electrically connected to the electrical storage element; the electric quantity display comprises an electric circuit and a display element; the electric circuit is electrically connected to the electrical storage element; the display element is exposed out of the body and is electrically connected to the electric circuit; the handle has a jack defined on an outer periphery thereof; the jack is electrically connected to the electrical storage element; the soldering device for plastics adhering further has a wire, one end of the wire is assembled to the jack, and another end of the wire is electrically connectable to an alternative current supplier; the soldering device for plastics adhering further has a solder; the solder has two attaching ends defined thereon; the two attaching ends of the solder are connectable to the two conducting rods respectively. Under this arrangement, when a user presses the button assembly, a unit of electricity is delivered to the conducting rod, so that an amount of heat is generated so as to adhere or repair cracks on an article.

Further benefits and advantages of the present invention will become apparent after a careful reading of the detailed description with appropriate reference to the accompanying drawings.

DETAILED DESCRIPTION OF THE INVENTION

Figure 1:
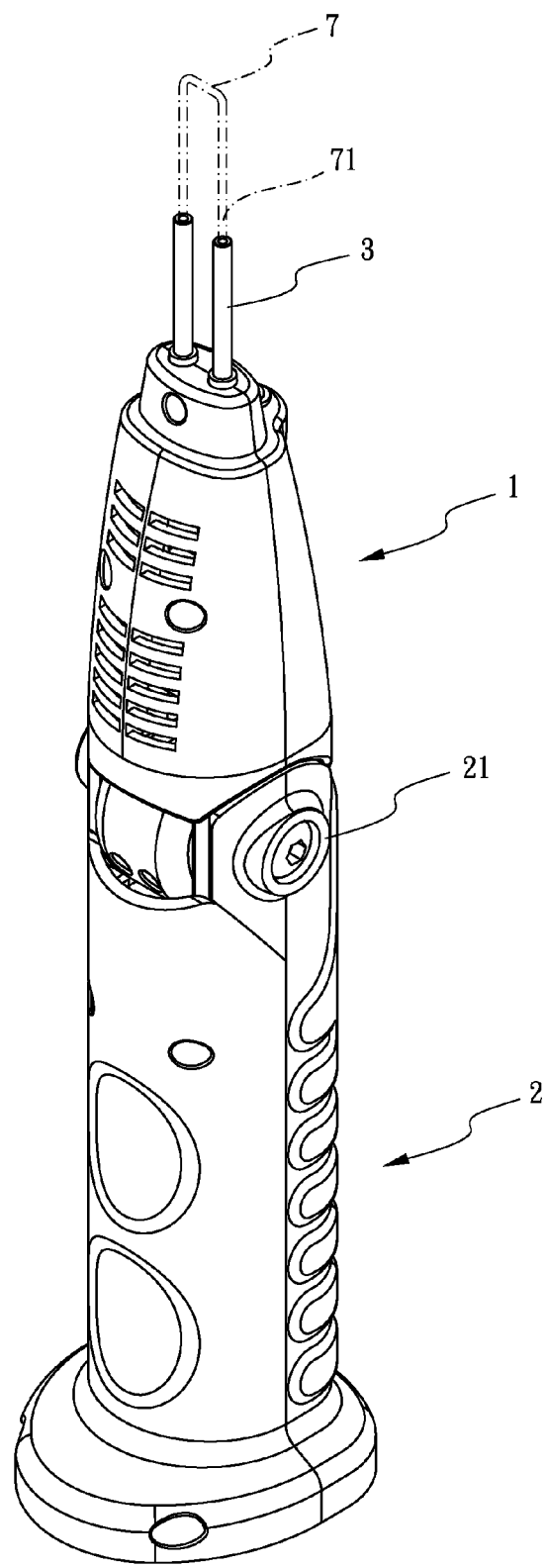
FIG. 1 is a perspective view of a soldering device for plastics adhering of the present invention.

Referring to FIGS. 1-3 and FIGS. 6-7, a soldering device for plastics adhering in accordance with the present invention comprises a body 1, a handle 2, two conducting rods 3 and an electrical storage element 4.

The handle 2 has two protruded rings 21 opened at one end therethrough. The handle 2 has a button assembly 22 defined at an outer periphery thereof.

The body 1 has a pivoting portion 11 defined at one end thereof. The pivoting portion 11 is pivotally assembled to the two protruded rings 21. The body 1 has a head portion 12 defined at another end thereof.

The body 1 is formed by two separated pieces (not numbered) and the handle 2 is formed by another two separated pieces (not numbered). The body 1 has a first receiving room (not numbered) defined therein. The handle 2 has a second receiving room (not numbered) defined therein. The first receiving room communicates with the second receiving room.

One end of each conducting rod 3 is inserted into the head portion 12 of the body 1, and another end of each conducting rod 3 is exposed out from the body 1. The conducting rods 3 are electrically connected to the button assembly 22. Each conducting rod 3 has an attaching hole (not numbered) axially opened therethrough.

The electronic storage element 4 is assembled into the second receiving room of the handle 2. The electronic storage element 4 is electrically connected to the button assembly 22 and the two conducting rods 3 (In a preferred embodiment, the electronic storage element 4 is a rechargeable battery).

Under this arrangement, the body 1 is pivotally rotated relative to the handle 2 in a certain angle between the body 1 and the handle 2, when a user presses the button assembly 22, a unit of electricity is delivered to the conducting rod 3, so that an amount of heat is generated so as to adhere or repair cracks on an article 8 which is plastic.

Figure 2:
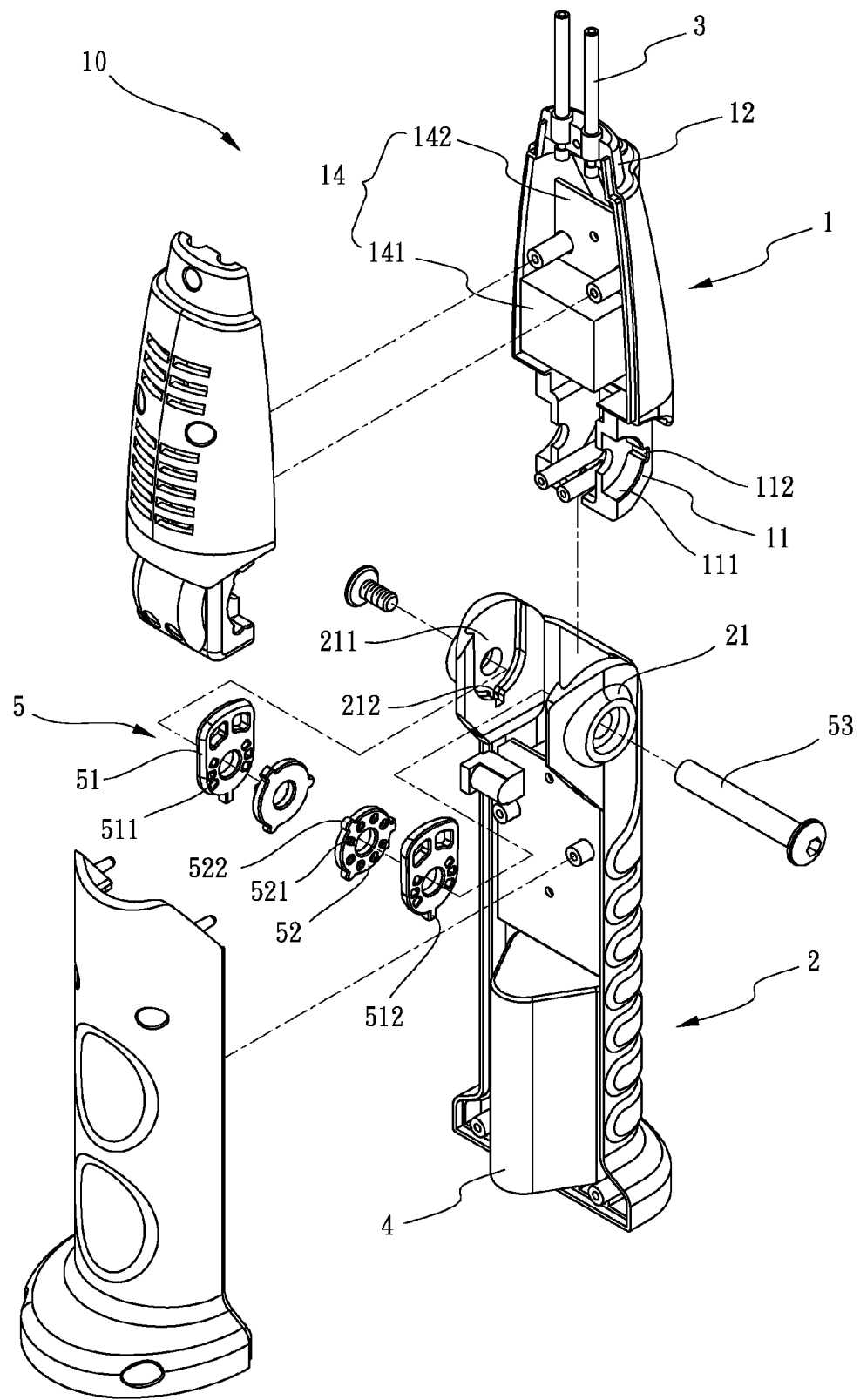
FIG. 2 is an exploded view of the soldering device for plastics adhering.
Figure 4:
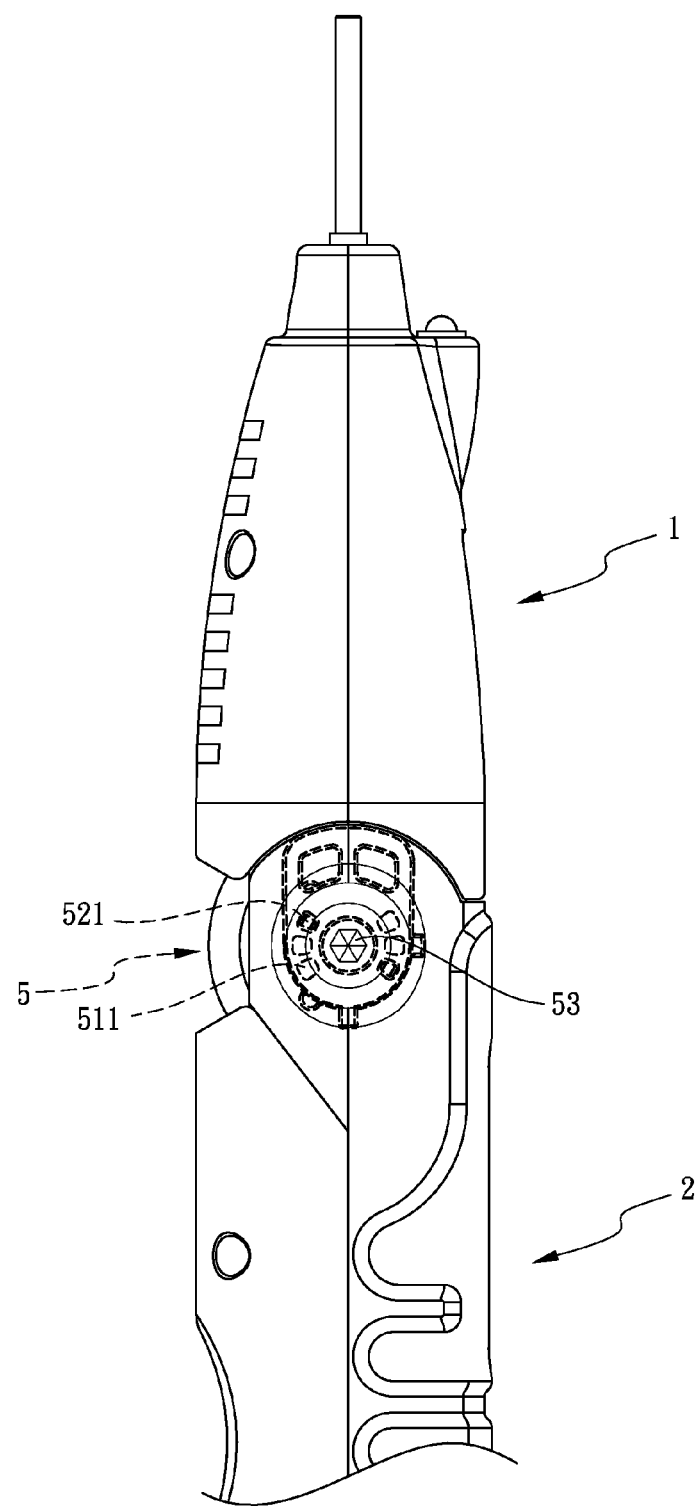
FIG. 4 is a partially side view of the soldering device for plastics adhering.
Figure 5:
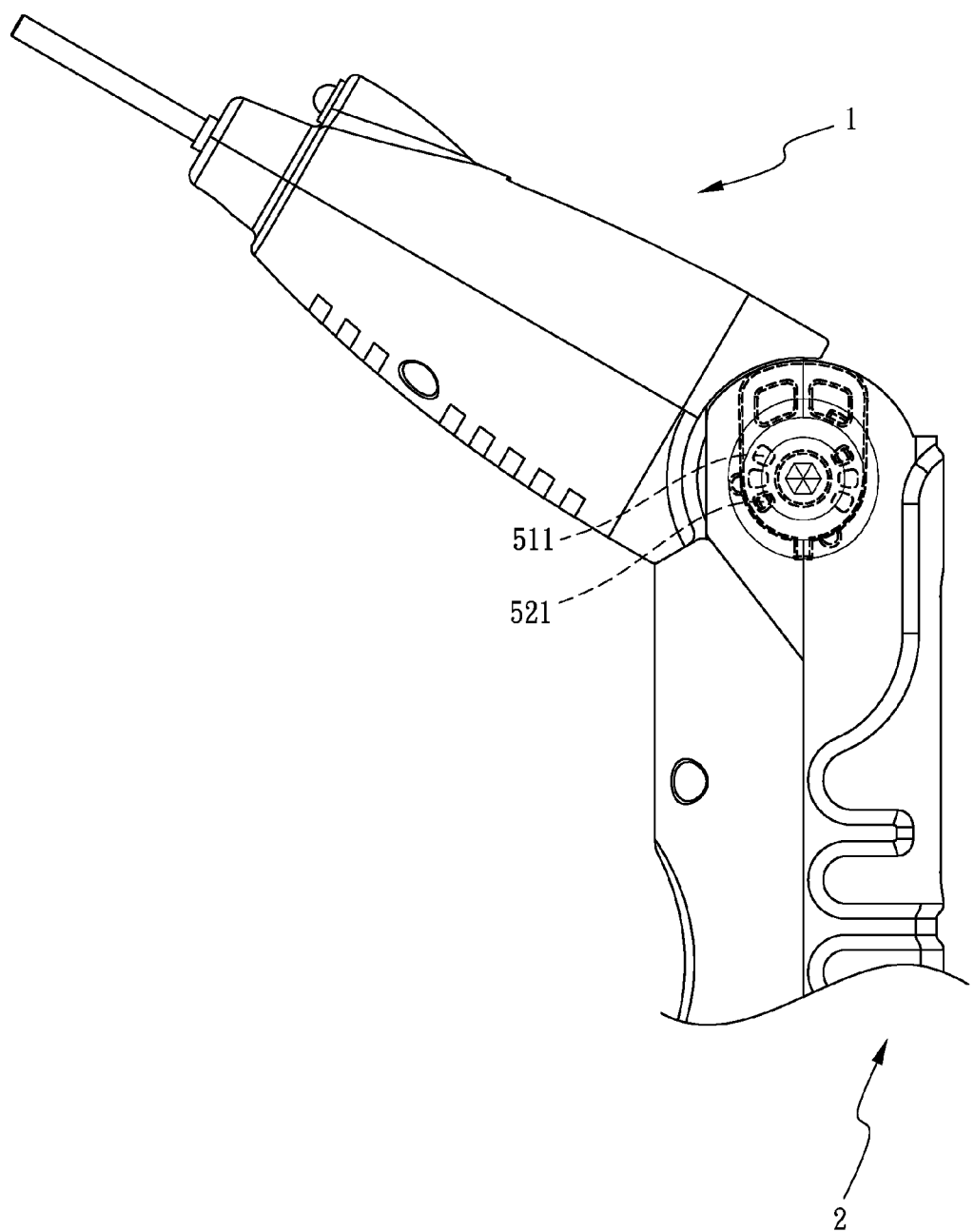
FIG. 5 is a partially side view of the soldering device for plastics adhering for showing a body is pivotally rotated relative to a handling.

Referring to FIG. 2, FIG. 4 and FIG. 5, the pivoting portion 11 of the body 1 has two limiting rooms 111 opened at two sides thereof. Each limiting room 111 has a limiting hole (not numbered) opened therethrough. The handle 2 has two positioning rooms 211 opened thereon. Each positioning room 211 is opposite to each corresponding protruded ring 21. Each positioning room 211 has a positioning hole (not numbered) opened therethrough. The two positioning rooms 211 communicate with each other via the two positioning holes. The two positioning rooms 211 correspond to the two limiting rooms 111 respectively. The present invention further has a pivoting assembly 5. The pivoting assembly 5 comprises two positioning slices 51, two limiting slices 52 and a pivoting rod 53. The two positioning slices 51 are assembled into the two positioning rooms 211 respectively. Each positioning slice 51 has a plurality of positioning apertures 511 opened thereon (In a preferred embodiment, each positioning slice 51 has six positioning apertures 511. Three of the positioning apertures 511 are defined at a left part of one side of the positioning slice 51, and another three of the positioning apertures 511 are defined at a right part of one side of the positioning slice 51). The two limiting slices 52 are assembled into the two limiting rooms 111 respectively. Each limiting slice 52 is slightly circular shaped. An area of the limiting slice 52 is smaller than another area of the positioning slice 51. Each limiting slice 52 has a plurality of limiting blocks 521 extruded thereon. The limiting blocks 521 correspond to the positioning apertures 511 (In a preferred embodiment, each limiting slice 52 has two limiting blocks 521. The two limiting blocks 521 are symmetrical with each other. One limiting block 521 is selectively located into one of the three positioning apertures 511, and another one limiting block 521 is selectively located into one of another three positioning apertures 511). The body 1 and the handle 2 are pivotally assembled to form a soldering gun 10. To assemble the pivoting assembly 5 with the soldering gun 10, firstly the pivoting rod 53 is passed through one protruded ring 21, one positioning slice 51, and one limiting slice 52 in order; then, the pivoting rod 53 is passed through the pivoting portion 11 of the body 1; and then, the pivoting rod 53 is further passed through another limiting slice 52, another positioning slice 51, and another protruded ring 21 in order; thereby, the pivoting rod 53 is passed through the soldering gun 10 from one side thereof to another side thereof; finally, the pivoting rod 53 is locked by a screw (not numbered).

Referring to FIGS. 1-5, an operation of adjusting an angle between the body 1 and the handle 2 is described as following.

With the pivoting rod 53 being defined as a pivoting center, firstly the body 1 is pivotally rotated relative to the handle 2 so as to drive the two limiting slices 52 to rotate relative to the two positioning slices 51 respectively; thereby, the two limiting blocks 521 of each limiting slice 52 detach from two positioning apertures 511 of each corresponding positioning slice 51 and engage with another two positioning apertures 511 of said positioning slice 51; thus, said limiting slice 52 is fastened with said positioning slice 51; as a result, the angle between the body 1 and the handle 2 is adjusted and fastened. Referring to FIGS. 4-5, when the angle between the body 1 and the handle 2 is 180 degree, one limiting block 521 is located into the first one of the three positioning apertures 511, and another limiting block 521 is located into the third one of another three positioning apertures 511. When the body 1 is counterclockwise pivotally rotated relative to the handle 2 so that the angle between the body 1 and the handle 2 is 120 degree, one limiting block 521 is detached from the first one of the three positioning apertures 511 and is moved into the third one of the three positioning apertures 511, and another limiting block 521 is detached from the third one of another three positioning apertures 511 and is moved into the first one of another three positioning apertures 511.

The angle between the body 1 and the handle 2 is at a range from 120 to 180 degrees (The number of the angle between the body 1 and the handle 2 is not limited by the present invention). Referring to FIGS. 1-7, the further details of the present invention are shown as following:

1. Each limiting slice 52 has a plurality of limiting ribs 522 extruded from an outer periphery thereof. Each limiting room 111 has a plurality of limiting grooves 112 recessed therein. The limiting ribs 522 correspond to the limiting grooves 112 respectively so as to prevent said limiting slice 52 from rotating relative to said limiting room 111 (In a preferred embodiment, each limiting slice 52 has three limiting ribs 522 and each limiting room 111 has three limiting grooves 112).

2. Each positioning slice 51 has a positioning rib 512 extruded from an outer periphery thereof. Each positioning room 211 has a positioning groove 212 recessed therein. The positioning rib 512 corresponds to the positioning groove 212 respectively so as to prevent said positioning slice 51 from moving relative to said positioning room 211.

Figure 3:
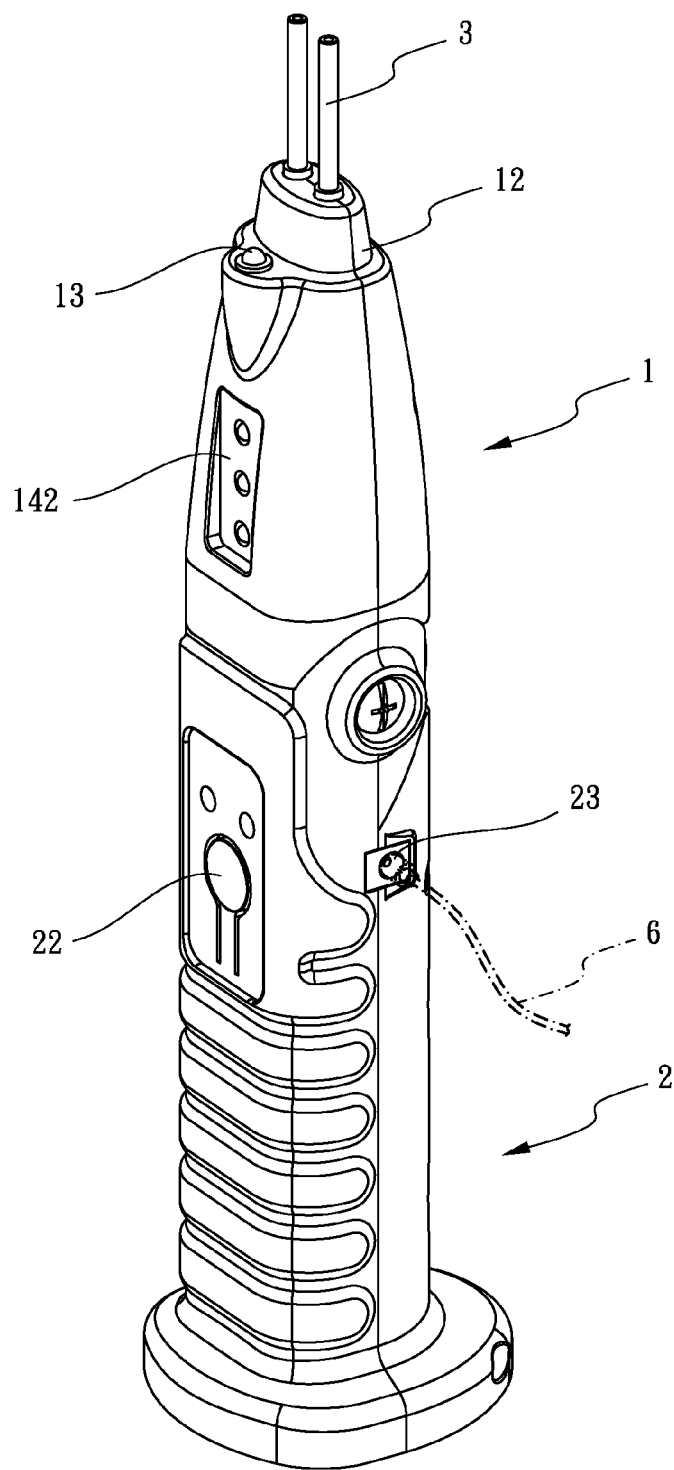
FIG. 3 is another perspective view of the soldering device for plastics adhering.

3. Referring to FIG. 3, the body 1 has a lightening element 13 defined thereon. The lightening element 13 is electrically connected to the electrical storage element 4 and the button assembly 22 separately. A light projecting direction of the lightening element 13 corresponds to another ends of the conducting rods 3. Under this arrangement, when the user is working in a dark circumstance, the user presses the button assembly 22 to turn on the lightening element 13 so as to offer a light source for the user.

4. The body 1 has an electric quantity display 14 defined thereon. The electric quantity display 14 is electrically connected to the electrical storage element 4. The electric quantity display 14 comprises an electric circuit 141 and a display element 142. The electric circuit 141 is electrically connected to the electrical storage element 4. The display element 142 is exposed out of the body 1 and is electrically connected to the electric circuit 141. Under this arrangement, the electric circuit 141 detects an electric quantity of the electrical storage element 4 firstly; then, information of said electric quantity is displayed on the display element 142 for the user. Referring to FIG. 3, the display element 142 further has three light units (not numbered) spacingly assembled thereon. The three light units indicate a low electric quantity state, a recharging state, and a full electric quantity state respectively.

5. The handle 2 has a jack 23 defined on an outer periphery thereof. The jack 23 is electrically connected to the electrical storage element 4. A wire 6, one end of the wire 6 is assembled to the jack 23, and another end of the wire 6 is electrically connectable to an alternative current supplier (not shown). Under this arrangement, when the electric quantity of the electrical storage element 4 is low, another end of the wire 6 is electrically connected to the alternative current supplier so as to recharge the electrical storage element 4.

Figure 6:
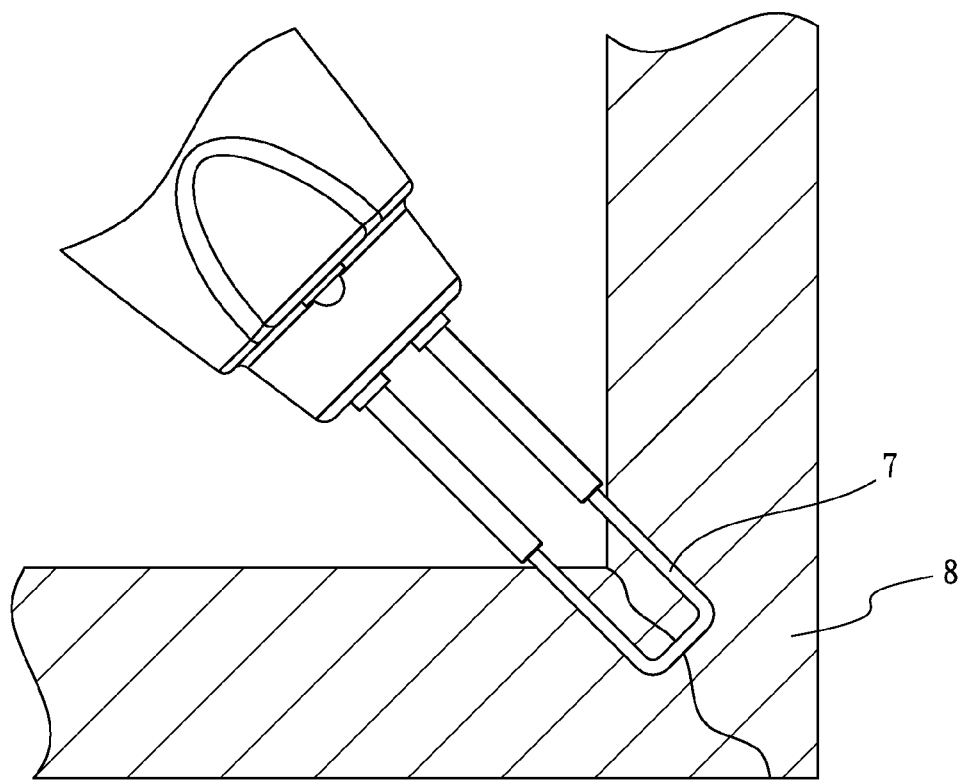
FIG. 6 is a schematic view of the soldering device for plastics adhering for showing the soldering device for plastics adhering is soldering on a corner of an article.
Figure 7:
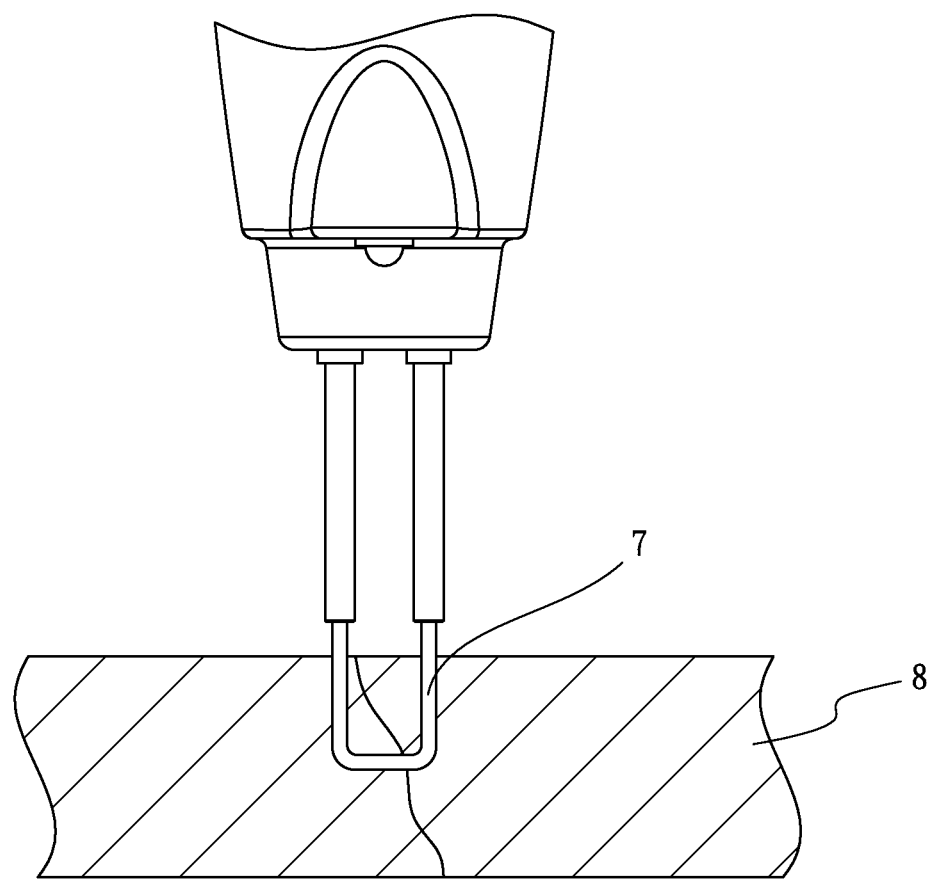
FIG. 7 is a schematic view of the soldering device for plastics adhering for showing the soldering device for plastics adhering is soldering on a plane of the article.

6. Referring to FIGS. 6-7, the present invention further has a solder 7. The solder 7 has two attaching ends 71 defined thereon. The two attaching ends 71 of the solder 7 are connectable to the two attaching holes of the two conducting rods 3 respectively. Under this arrangement, when the user presses the button assembly 22, said electricity is delivered to the conducting rod 3, and said heat is generated and is further delivered to the solder 7 so as to adhere and to repair the cracks on the article 8; then, the user buries the solder 7 into the article 8 regardless of the cracks are at a plane of the article 8 or the cracks are at a corner of the article 8; thereby, the solder 7 melts parts of the article 8 because of said heat so as to enhance the adhesion of the crack on the article 8; finally, the solder 7 is detached from the conducting rod 3 and parts of the solder 7 which are exposed out of the article 8 are removed.

All in all, when the user solders the cracks which are at a corner of the article, the user do not need to twist their wrist for soldering the article in a long period. Therefore, the user will not feel uncomfortable because the angle between the body 1 and the handle 2 is rotatable.

Although the invention has been explained in relation to its preferred embodiment, it is to be understood that many other possible modifications and variations can be made without departing from the spirit and scope of the invention as hereinafter claimed.

What is claimed is:

1. A soldering device for plastics adhering comprising:
    a body (1), a handle (2), two conducting rods (3) and an electrical storage element (4);
    the handle (2) having two protruded rings (21) opened at one end therethrough, the handle (2) having two positioning rooms (211) opened thereon; each positioning room (211) being opposite to each corresponding protruded ring (21); the handle (2) having a button assembly (22) defined at an outer periphery thereof;
    the body (1) having a pivoting portion (11) defined at one end thereof, the pivoting portion (11) of the body (1) having two limiting rooms (111) opened at two sides thereof; the two positioning rooms (211) located corresponding to the two limiting rooms (111) respectively; each positioning room (211) having a positioning groove (212) recessed therein; the pivoting portion (11) pivotally assembled to the two protruded rings (21), the body (1) having a head portion (12) defined at another end thereof, the body (1) pivotally rotated relative to the handle (2) in a certain angle between the body (1) and the handle (2);
    one end of each conducting rod (3) inserted into the head portion (12) of the body (1), another end of each conducting rod (3) exposed out from the body (1), the conducting rods (3) electrically connected to the button assembly (22);
    the electronic storage element (4) assembled into the handle (2), the electronic storage element (4) electrically connected to the button assembly (22) and the two conducting rods (3); and
    the soldering device for plastics adhering further having a pivoting assembly (5) comprising two positioning slices (51), two limiting slices (52) and a pivoting rod (53);
    the two positioning slices (51) being assembled into the two positioning rooms (211) respectively; each positioning slice (51) having a plurality of positioning apertures (511) opened thereon; each positioning slice (51) having a positioning rib (512) extruded from an outer periphery thereof; the positioning rib (512) located corresponding to the positioning groove (212) respectively; the two limiting slices (52) being assembled into the two limiting rooms (111) respectively; each limiting slice (52) having a plurality of limiting blocks (521) extruded thereon; the limiting blocks (521) located corresponding to the positioning apertures (511); the pivoting rod (53) passing through protruded rings (21) of the handle (2), the pivoting portion (11) of the body (1), the positioning slices (51) and the limiting slices (52) so that the body (1) is pivotally rotated relative to the handle (2) so as to drive one limiting block (521) to locate into any one of the positioning apertures (511);
    wherein when a user presses the button assembly (22), a unit of electricity is delivered to the conducting rod (3), so that an amount of heat is generated so as to adhere or repair cracks on an article (8).

2. The soldering device for plastics adhering as claimed in claim 1, wherein each limiting slice (52) has a plurality of limiting ribs (522) extruded from an outer periphery thereof; each limiting room (111) has a plurality of limiting grooves (112) recessed therein; the limiting ribs (522) correspond to the limiting grooves (112) respectively.

3. The soldering device for plastics adhering as claimed in claim 1, wherein the body (1) has a lightening element (13) defined thereon; the lightening element (13) is electrically connected to the electrical storage element (4) and the button assembly (22) separately.

4. The soldering device for plastics adhering as claimed in claim 1, wherein the body (1) has an electric quantity display (14) defined thereon; the electric quantity display (14) is electrically connected to the electrical storage element (4).

5. The soldering device for plastics adhering as claimed in claim 4, wherein the electric quantity display (14) comprises an electric circuit (141) and a display element (142); the electric circuit (141) is electrically connected to the electrical storage element (4); the display element (142) is exposed out of the body (1) and is electrically connected to the electric circuit (141).

6. The soldering device for plastics adhering as claimed in claim 1, wherein the handle (2) has a jack (23) defined on an outer periphery thereof; the jack (23) is electrically connected to the electrical storage element (4); the soldering device for plastics adhering further has a wire (6), one end of the wire (6) is assembled to the jack (23), and another end of the wire (6) is electrically connectable to an alternative current supplier.

7. The soldering device for plastics adhering as claimed in claim 1, wherein the soldering device for plastics adhering further has a solder (7); the solder (7) has two attaching ends (71) defined thereon; the two attaching ends (71) of the solder (7) are connectable to the two conducting rods (3) respectively.

\* \* \* \* \*